E. A. SPERRY.
AEROPLANE STABILIZER.
APPLICATION FILED JULY 17, 1914.
1,368,226.
Patented Feb. 8, 1921.
6 SHEETS—SHEET 1.
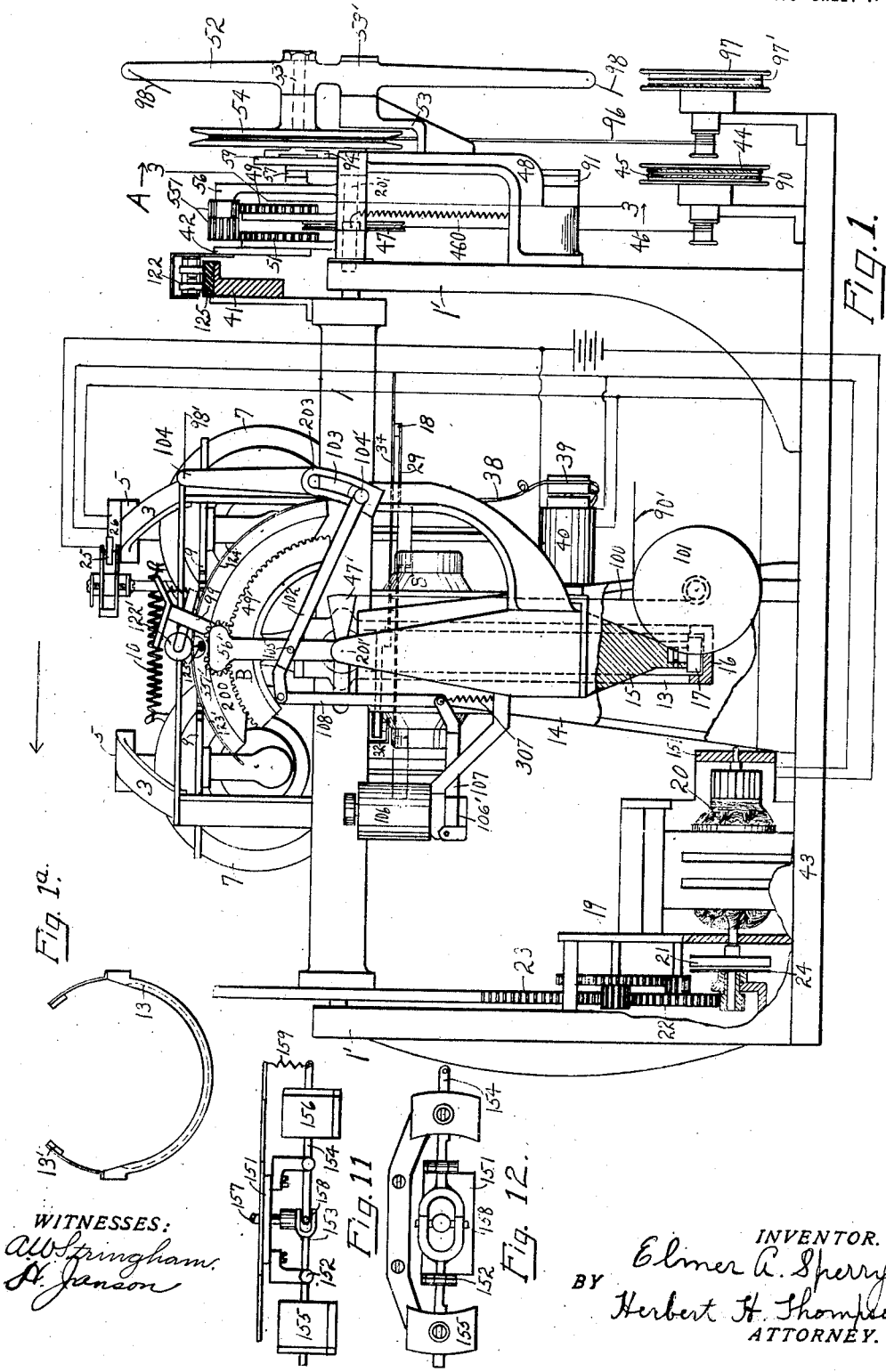
WITNESSES:
INVENTOR.
Elmer A. Sperry
BY Herbert H. Thompson
ATTORNEY.

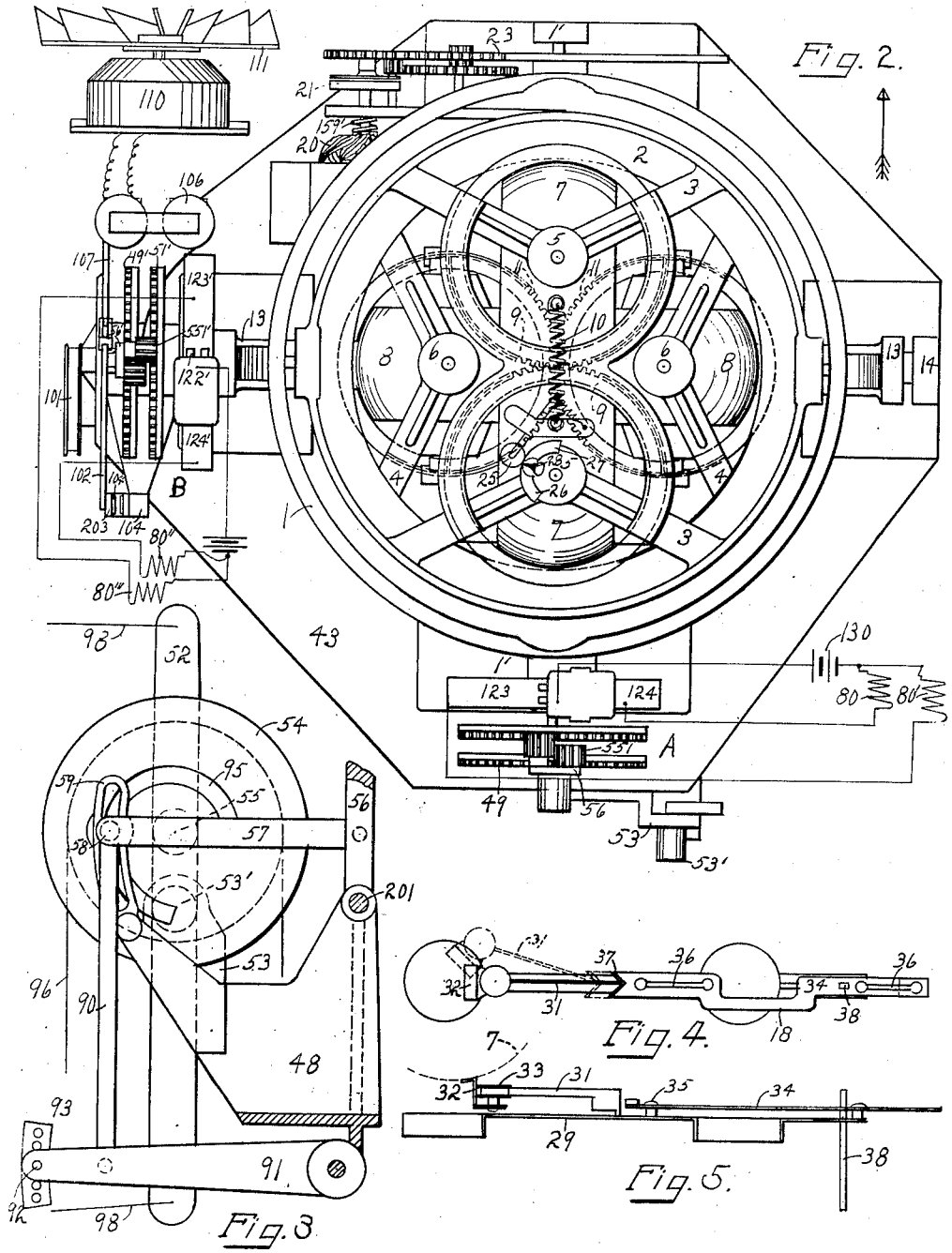

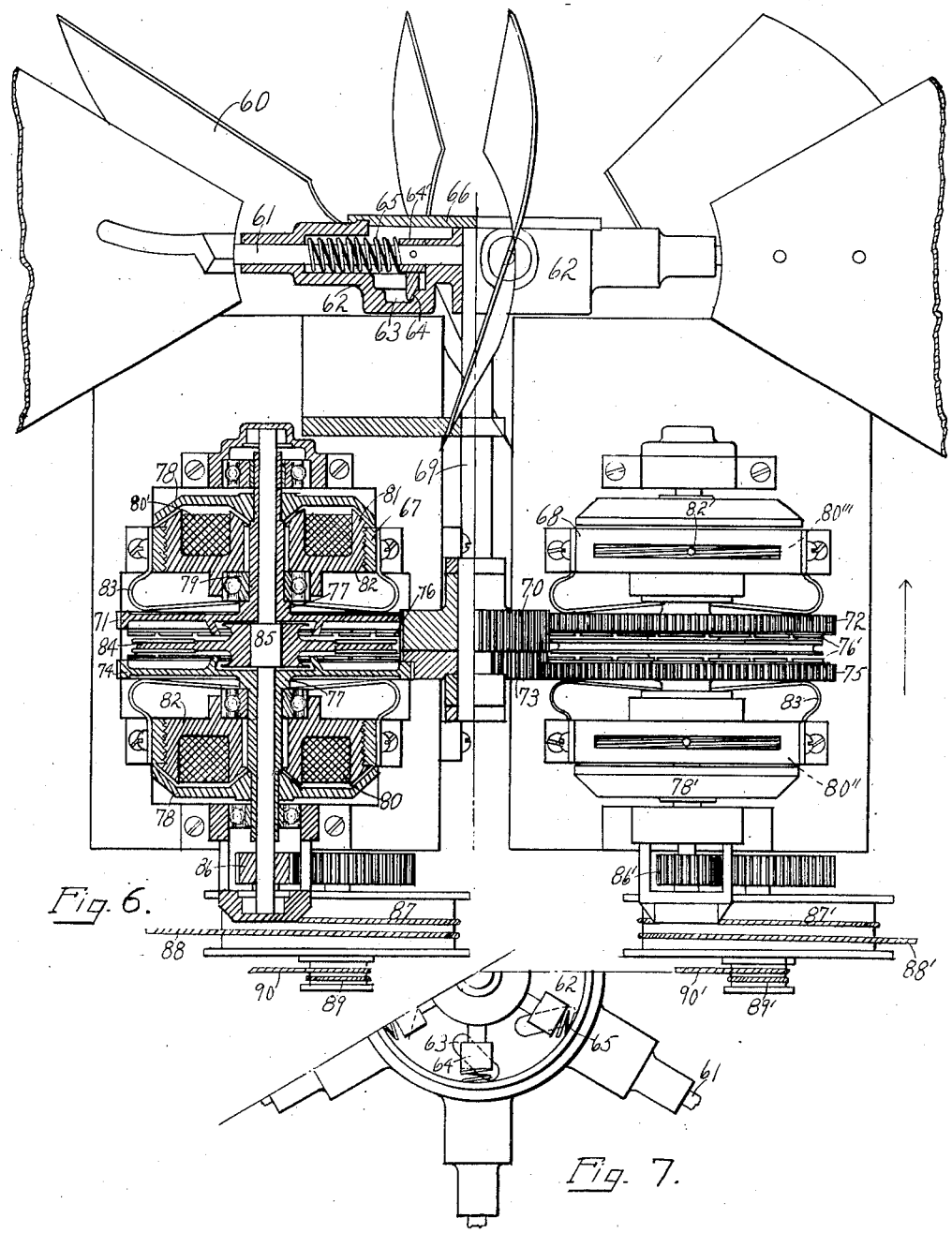

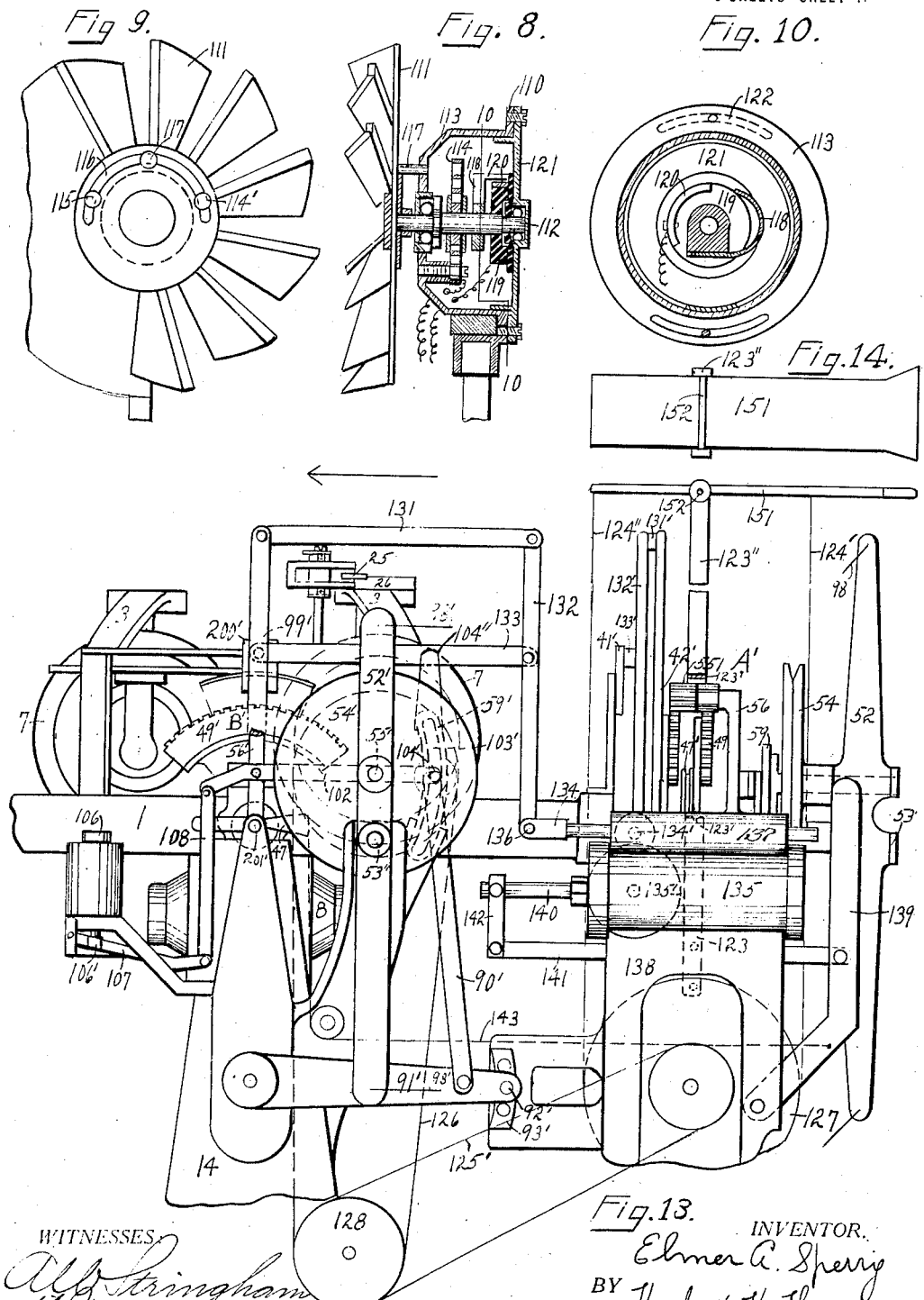

E. A. SPERRY.
AEROPLANE STABILIZER.
APPLICATION FILED JULY 17, 1914.

1,368,226.

Patented Feb. 8, 1921.
6 SHEETS—SHEET 5.

WITNESSES

INVENTOR.
Elmer A. Sperry
BY Herbert H. Thompson
ATTORNEY.

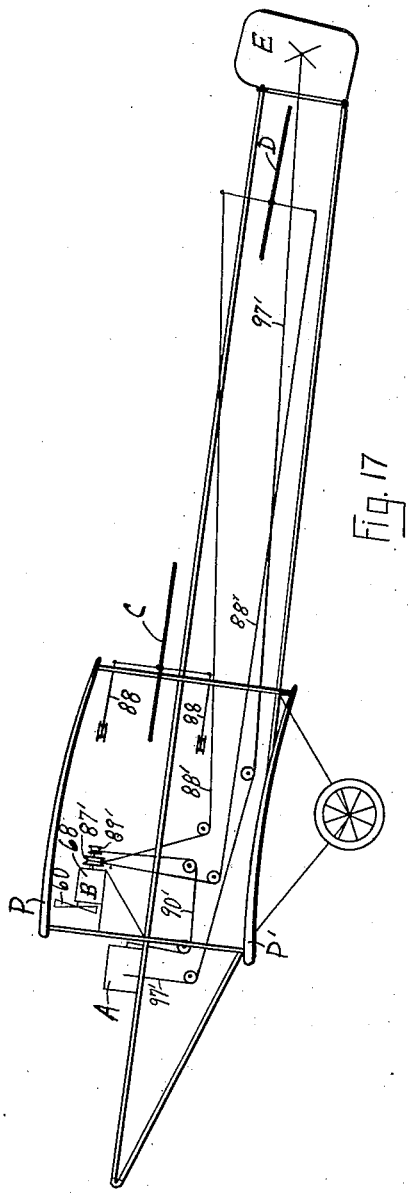
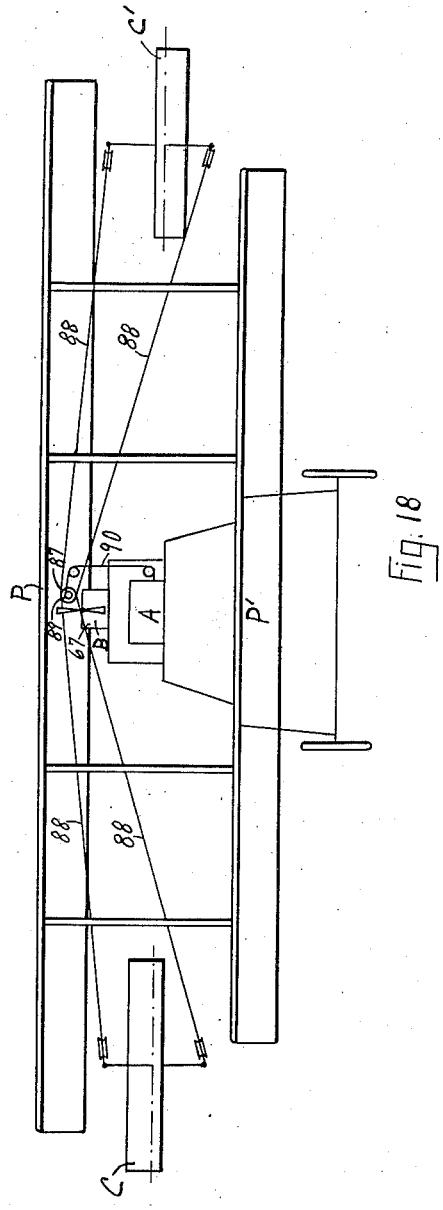

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

AEROPLANE-STABILIZER.

1,368,226.          Specification of Letters Patent.        Patented Feb. 8, 1921.

Application filed July 17, 1914. Serial No. 851,477.

*To all whom it may concern:*

Be it known that I, ELMER AMBROSE SPERRY, a citizen of the United States, residing at Brooklyn, New York, have invented a new and useful Improvement in Aeroplane-Stabilizers, of which the following is a specification.

This invention has for its main object the provision of a complete system of automatic control to effect the stabilization of aeroplanes and similar craft. Subsidiary objects of the invention, all of which contribute to the main result, but which are of great individual importance, are to adapt a special construction of a stabilized system of gyroscopes for use on an aeroplane to improve the construction of the control elements, whereby certain corrective and sensitizing factors are introduced, and to improve the means used to move the stabilizing planes, both with respect to the prime mover and the transmission system. My control means is so designed that it may be applied to any type of air craft.

In the accompanying drawings, forming a part of this specification, a preferred form of my invention is illustrated.

Figure 1 is a side elevation, partly in section, of the gyroscopic stabilized system with the master controlling switches in position.

Fig. 1ª is a detail.

Fig. 2 is a plan view of the same, with certain parts of the lateral control system removed.

Fig. 3 is a section on line 3—3 of Fig. 1.

Fig. 4 is a plan view of a detail which I term a "decentralizer."

Fig. 5 is a side elevation of the same.

Fig. 6 is a plan view, partly in horizontal section, of one form of prime mover and transmission system I employ to actuate the stabilizing planes.

Fig. 7 is a detail of the prime mover, which, as will be seen, is a novel form of wind mill.

Fig. 8 is a vertical section of a special safety device employed, which is operatively connected with the control system.

Figs. 9 and 10 are details of the same, Fig. 10 being a section on line 10—10 of Fig. 8.

Figs. 11 and 12 are two views of a detail of the force impressor motor.

Fig. 13 is an elevation of a modified form of control system.

Fig. 14 is a detail.

Fig. 17 is a diagrammatic side view of an aeroplane, showing my longitudinal system of control.

Fig. 18 is a similar front view, showing my lateral system of control.

Figure 15:
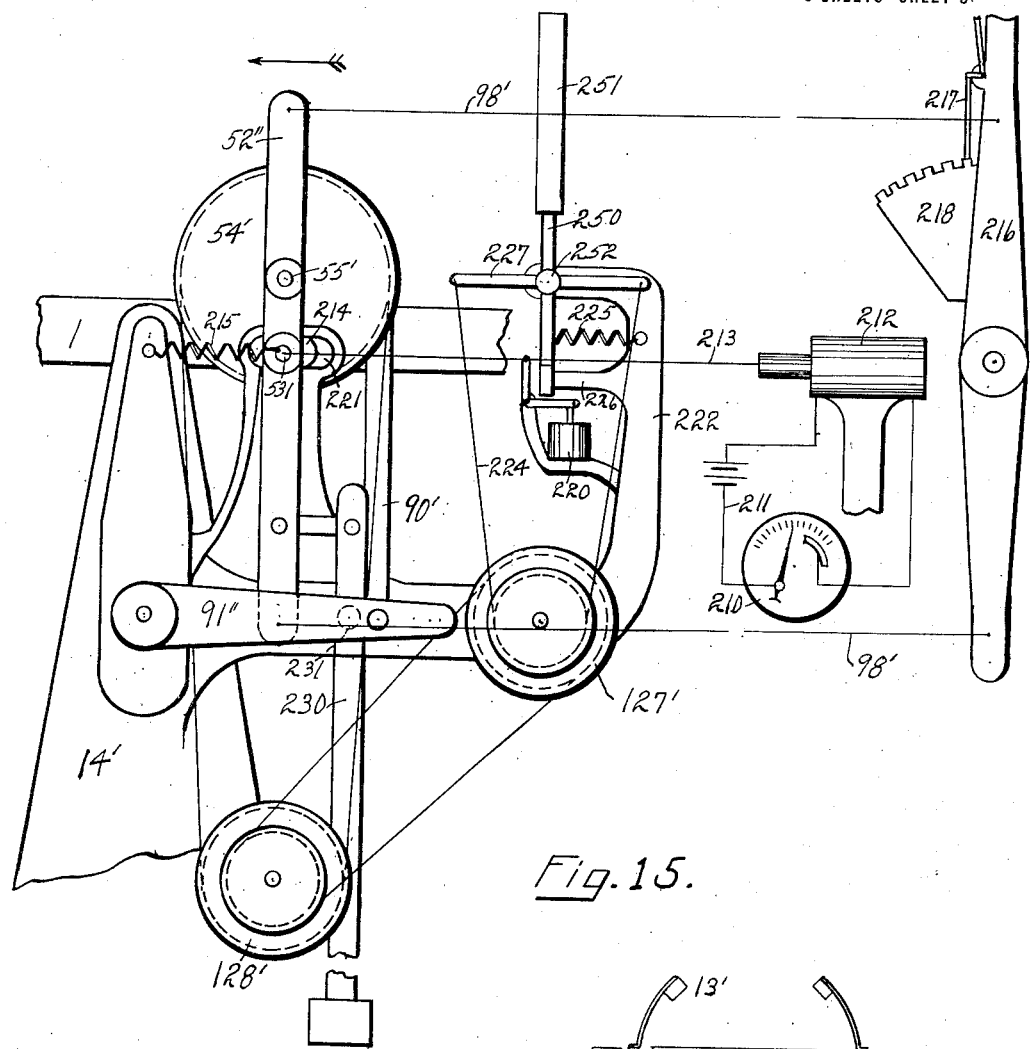
Fig. 15 shows features of my invention not shown in the other figures, but applicable to the structure therein disclosed.
Figure 16:
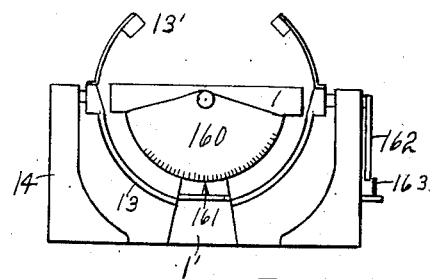
Fig. 16 is a detail showing the inclinometer feature of my invention.

An arrow on each of the main figures shows the heading of the aeroplane, thereby indicating the position of the apparatus on the aeroplane.

The control of my system depends upon the difference in inclination of a plane stabilized in a fixed position and the inclination of the frame, or parts thereof, of the aeroplane, due to changes in the force and direction of the wind. The relative movement thus produced is made use of to actuate what may be termed generically the stabilizing planes of the aeroplane (such as rudders, ailerons, flexible wing tips and the like). I employ the system of gyroscopes illustrated in Figs. 1 and 2 in order to obtain a perfectly stabilized reference plane or platform.

I use the term gyroscope throughout this specification to include at least the following elements: 1st, a rotor, 2nd, a rotor frame and 3rd, a frame which permits precession of the rotor frame.

I prefer to employ four rotors, or gyroscopic wheels, which are arranged in pairs, one pair stabilizing about each horizontal axis. Both pairs are mounted on a common support, which is shown as a pair of Cardan rings and pivoted within brackets 1', so as to be free from turning moments about both horizontal axes. Four frames, 3, 3 and 4, 4, of special construction are secured to the inner ring 2, frames 3, 3 being secured on top of and frames 4, 4 beneath the ring. These frames I term the precessional frames. They are provided with vertical bearings 5 and 6 in which the rotor frames 7 and 8, or the frames carrying the bearings for the wheels, are pivoted. The bearings are normally horizontal and the two pairs are at right angles to each other. The rotors of each pair are designed to rotate in opposite directions. The rotor frames 7 are each provided with means to prevent all precession on axes 5, except equal and opposite precession. This means may be of any form and is shown as a segmental gear 9 secured to each frame and intermeshing. A normal centralizing means is also used, which in the embodiment shown takes the form of a spring 10 secured to each frame. The rotor frames 8 are provided with similar gears 11 and a spring (not shown). The rotors are designed to be driven by three phase current and are of the same general type as illustrated in the British patent to E. A. Sperry, No. 2294, October 23, 1913, or in the copending application of E. A. Sperry, Serial No. 708,809, filed July 11, 1912.

The apparatus is designed to be secured to an aeroplane so that it will assume the position shown in Fig. 2, when the aeroplane is heading in the direction of the arrow. The system as a whole is made pendulous by placing the pivots of the ring 1 above the center of gravity. Each pair of gyros is statically balanced about their precession axes. That is, they are so constructed that acceleration pressures will exert no torque about these axes. This may be done by balancing the pair as a geared unit about the vertical axis, since an unbalanced condition of one could be counterbalanced by a similar condition of the other. I find it preferable, however, to balance each rotor frame about its individual precession axis. Analysis of the forces acting on the system will show that any force tending to tilt it about a lateral axis, i. e., forces due to pitching of the craft, will be resisted by the pair of gyros 8, 8, since they are free to precess in their precessional bearings 6 in frames 8; while any force tending to tilt the system about a longitudinal axis, i. e., forces due to rolling, will be resisted by the pair of gyros 7, 7, for similar reasons. Since the gyros are statically balanced about the vertical axis, no acceleration pressure will be exerted about this axis. When the machine turns, however, the spinning axes of the gyros are turned about the vertical axis, but since the gyros are mounted in oppositely rotated pairs and geared for equal and opposite precession, no precession about either horizontal axis will be caused. Since each pair thus broadly performs an independent function to a certain extent, prior workers in the art of stabilizers for ships have mounted each pair on an independent platform, which is only stabilized about one axis. I desire to point out that the platform on which I mount my gyros is stabilized about both axes, due to the fact that I mount both pairs on the same platform. I consider this an important advance in the art, since, while the prior system was adapted for use on ships which have two degrees of movement only, it is unsuited to air craft, which can move in four directions. The reason is that aeroplanes often turn so as to change their direction in azimuth while ascending or descending, that is while not flying horizontal, which introduces a torque about a vertical axis, which is not perpendicular to the inclined platform supporting the lateral stabilizer gyros and which will cause said inclined platform to tilt over on its side, as the aeroplane turns.

We thus see that we have a reference plane or platform (ring 2) stabilized about both horizontal axes. Ring 1 is stabilized about the fore and aft line, only, its pivot pins being secured in brackets 1'. It is, therefore, found expedient to mount the lateral control system A near one of these pivots on the adjacent bracket, so that any relative tilting between the ring 1 and the fixed bracket 1' will actuate the controlling means. I also mount on ring 1 means to indicate the inclination of the aeroplane. This means comprises a scale 160 secured on the axis of the ring and a pointer 161 on bracket 1'. For the sake of clearness these parts are omitted from Figs. 1 and 2 and are shown in a separate figure (16).

I make use of ring 2 to control the longitudinal control system B by means of bail 13, pivoted in brackets 14, which are placed at right angles to brackets 1'. On the bottom of the frames 4, 4 is attached a projection 15, which has an extension guided in a groove 16 in the bail. Anti-friction means 17 may be provided so that swinging of the ring 2, and its attached parts, laterally will have no effect on either the gyros or the bail, while fore and aft tilting will swing the bail with it.

Inclinometer means are also mounted adjacent bail 13 and comprise scale 162 on one end of the bail and pointer 163. Both inclinometer scales prove a valuable asset to the aviator in aiding him to determine the exact condition under which he is flying.

The control system is mounted partly on a bracket 14 and partly on one end of bail 13, as shown. Bail 13 may be balanced by weights 13', as shown in Fig. 1ᵃ. The details of my control system will be explained hereinafter. It is apparent, however, that the first essential of the type of stabilizer I employ is to secure an absolutely stable reference platform. In order to accomplish this, I make use of a novel arrangement which forms the subject matter of a joint copending application of Mr. Harry L. Tanner and myself, filed July 15, 1914, Serial No. 850,874. Its application to an aeroplane is as follows:

The function of the centralizing springs 10 is to return the gyros to their central position, after precession. They will perform this function accurately as long as the external forces causing the initial precession are of short duration and are equal and opposite, or, more strictly speaking, as long as the resultant of the forces over a reasonably short period of time is zero. But if a single torque is applied for a time and then released, the effect of the centralizing means is to cause a rotation of the gyroscopic frame in the direction of the applied torque. Such torques are especially troublesome when the aviator is descending in a series of spirals. It will thus be seen that while the gyroscopic system described above is admirably adapted for a body which moves slowly in the same direction, it is unsuited for use o nan aeroplane, or on any body on which sudden acceleration pressures due to starting and turning side-wise, or up or down, are apt to occur. To overcome these defects I employ what may be termed a force-impressor 19 and a decentralizer 18. The force impressor consists of any sort to force applying means adapted to exert a torque about an axis of the stabilized system, preferably about the longitudinal axis. I prefer to employ a different type of force impressor from that shown in said application. This consists of a special type of electric motor 20, which is connected through a clutch 21, operated by the endwise pull of the motor, and a train of gearing 22 to a segmental gear 23 on the ring 1. The clutch is provided so that normally the movements of the ring 1 may be as free as possible. Since it is very important that the clutch be held away from disk 24, except at a predetermined position of the gyros, special means illustrated in Figs. 11 and 12 are provided to prevent sudden jerks and acceleration forces from closing the clutch. These parts are not shown in Fig. 1, being broken away for sake of clearness. Fig. 11 is a top view and Fig. 12 an end elevation of these parts. The back plate 151 of motor 20 is provided with brackets 152 which carry vertical pivots for the levers 153 and 154. Adjustable masses 155 and 156 are mounted, one on each lever. Said levers are pivoted adjacent their inner ends to the motor shaft 157 by means of a collar carrying pins 158 which pass through their forked ends as shown. The masses are so adjusted that their combined moment will balance the mass of the motor armature so that, should the aeroplane suddenly stop, the inertia of the armature will not close the clutch, but will be balanced by the pull of the masses 155 and 156 on the shaft. A spring 159 is provided to hold the clutch normally open. The spring may assume the form shown at 159′ in Fig. 2. When the motor is energized, the armature pushes the clutch 21 into engagement with disk 24 and at the same time starts to revolve, thus applying a torque about the longitudinal axis. The effect of this torque is to cause precession of the pair of gyros 7, 7 in one direction or the other, depending on the direction in which the force is applied, so that it may be made use of to prevent excessive precession of the gyros, due to acceleration or other external forces, by tending to cause precession in the opposite direction and also to centralize the gyros. The motor 20 is controlled by contactors placed adjacent the precession axis 5 of one of the gyros 7. The spring-pressed trolley 25 is mounted on the rotor frame, while the segments 26 and 27 are secured to the bearing 5. Between the segments is an insulated knife edge 28 on which the trolley normally rests, but a precession of the gyro frames beyond a predetermined amount will cause the trolley to contact with one of the segments 26 or 27, and thus cause motor 20 to apply a torque tending to restore the gyros to their normal position. The centralizing spring takes care of small precessional movements, but, as above explained, its effect becomes deleterious when a large precession is to be dealt with. Accordingly I make use of the decentralizer 18, which is designed to neutralize the centralizing spring, and thus prevent precessional movement of the main frame due to said spring. The base 29 of the decentralizer is secured to a portion of the framework 3, 3 supporting the gyros preferably to the lower bearing blocks 5, 5. A sliding link 31 has a projection at one end which slides in a slot in the base, which is not shown but lies directly under link 31 in Fig. 4. Said link is attached at the other end to a bracket 32 through a swivel joint 33. Bracket 32 is secured to rotor frame 7, so as to be moved as indicated by dotted lines in Fig. 4 by the precession of the gyroscope. A spring-pressed stop 34 is mounted on the base 29 in the rear of link 31, by means of pins fixed on the base, which have heads 35 working in slots 36 in the stop 34, so that the stop is free to slide. The stop is provided with a forked end 37 to embrace the end of link 31. The stop is actuated through a flat spring 38, one end of which passes through a hole in the stop. The position of the spring is controlled by being secured to the armature 39 of an electromagnet 40, secured to a portion of the gyroscopic framework support on ring 2. When the magnet is energized, it pulls the spring over to the left in Fig. 1, which carries the stop into engagement with link 31, so that a pressure will be exerted on link 31 and consequently on the rotor frame in the position shown in dotted lines in Fig. 4, such that the force of the centralizing spring will in effect be neutralized. It should be noted that, by using a spring connection between the magnet 40 and link 31, the return of the rotor frame to its central position by the force impressor is not interferred with.

By connecting the magnet 40 in the same circuit with force impressor 19, that is by controlling it from contactors 25, 26 and 27, means are provided whereby the decentralizing means is actuated only when the force impressor is actuated, so that the two devices coöperate to produce an auxiliary centralizing means, which automatically substitutes itself for the normal centralizing means, at a predetermined point in the precession of the gyro and prevents further precession. While the motor 20 applies a torque about the axis of ring 1, it does not tilt the ring to a perceptible extent, firstly, since the torque it exerts is opposed by the external force (for instance centrifugal force) acting on the pendulous system of gyros which caused the original precession and, secondly, since any torque in excess of the external force is opposed by the precession of the gyros in the opposite direction from the original precession. It is obvious that a force impressor and decentralizing device may be provided for ring 2, if so desired, but as no acceleration forces of much magnitude are impressed about the lateral axis, I may employ simply a centralizing spring on the gyros 8 (not shown in Fig. 2 on account of the mass of other details). The effect of acceleration pressures about the lateral axis is further lessened by designing the apparatus so that its ballistic or pendulous factor about said axis is small, as compared to that about the longitudinal axis. This is accomplished mainly by placing the axis of ring 1 longitudinal.

I also wish it to be understood that the application of my invention is not limited to the exact type of gyroscopic frame work for centralizing means shown, but may be applied to all systems, including those which mount the spinning axis vertical and employ gravity to centralize the gyros about a horizontal axis.

My invention contemplates controlling the aeroplane from such a stabilized system of gyros by actuating the stabilizing planes of the aeroplane therefrom, either directly or indirectly. In either case the force impressor not only serves to overcome the effect of acceleration pressures, but also helps exert the necessary force to actuate the stabilizing means of whatever nature they may be. In the embodiment shown, the force required for this purpose has been reduced to a minimum by employing servo-motors, actuated from contacts or valves connected with the stabilized plane, so that the only actual work that falls directly on the stabilizer proper is that necessary to move the contacts or valves. The lateral control system is made up essentially of two elements, one of which (sector 41 in the main and 41' in the modified form) is fixed on ring 1, and the other of which (arm 42) is so mounted that its position is the resultant of several of the following factors:—first, the position of the main supporting planes; second, the position of the lateral stabilizing means; third, the position of the steering means or rudder, and fourth, the position of the hand control lever. The first factor is introduced simply through the fact that the whole mechanism connected to arm 42, including the arm itself, is mounted on the base 43 which of course tilts with the aeroplane, so that the arm 42 will tilt with respect to the sector 41 when the aeroplane tilts laterally. The second factor, which constitutes in effect a follow up system, is introduced through a drum 44 from one portion 45 of which cords 90 extend to lateral stabilizing planes or to the mechanism 89 that controls them. (See Fig. 6). A wire or cord 46 is secured to a part of drum 44 and extends to a sector 47 pivoted on a pivot pin 201 between bracket 1' and an extension 48 in line with the axis of ring 1. To keep wire 46 taut and to move sector 47 against the direction of pull of wire 46, when the ailerons are being adjusted in the opposite direction, I provide a tension spring 460 connected to sector 47 on the opposite side of the pivot 201 from cord 46. Said spring 460 rotates sector 47 about its pivot as soon as the tension on wire 46 is slacked through the rotation of drum 44. While sector 47 may be directly connected to arm 42, it is shown as connected to a gear sector 49, which drives a pair of intermeshing pinions 551, driving sector 51. Said sector is also pivoted on pin 201 and carries arm 42. The purpose of this special connection is to effect the introduction of the other factors, but it constitutes nothing more than a direct connection as far as these two factors are concerned. Their action is differential, however, since when the aeroplane tilts every part of it tips with it except the stabilized system. The action of these two factors is as follows:—

When a sudden gust of wind tips the aeroplane to the right (Fig. 2), arm 42 is moved to the right and actuates through connections hereinafter described the controlling means which turn the stabilizing planes (ailerons, flexible wing tips or the like) so as to right the aeroplane. As these planes are turned, however, the arm 42 is moved back to its central position through the sector 47, so that it is maintained near the central or sensitive position. This feature is of great importance, since it increases the sensibility and reliability of the control. It also serves to prevent said planes from being moved too far so as to throw the aeroplane back beyond its position of equilibrium and thus cause serious oscillations. The action of arm 42 is somewhat oscillatory and it adjusts the position of the control planes in relatively small steps. Such a method of control is especially adapted to control the position of electric contacts such as described hereinafter.

The correcting factors from the steering rudder and the hand control are introduced by a compensating system whereby the motion communicated to the arm is the resultant of the various factors. The hand lever 52 is pivoted at 53' on a bracket 53 and supports the cam 54 through a pivot 55 at a distance above the pivot of the hand lever. Pinions 551 are mounted on an arm 56, pivoted on pin 201, which hence becomes the arm and pinions 551 become the planetary gears of the differential gear train 49—551—51. Pivoted to the arm 56 is a link 57, which is provided adjacent one end with a headed pin 58 adapted to fit loosely in a circular slot of the oscillatory sector 59, pivoted on an extension from bracket 53. The position of pin 58 in the slot is controlled by a link 90 which is pivoted at one end to link 57 and at the other end to lever 91. Said lever is pivoted to the bracket 48 and is angularly adjustable by means of a pin 92 in one end and holes in a fixed plate 93. The sector 59 is provided with a projection 94 which works in the cam groove 95 of cam 54. The angular position of the cam is controlled from the steering rudder E (Fig. 17) by means of wires 96 leading to a drum 97 from which cords 97' lead to the rudder. The operation of this portion of the control is as follows:

When the hand lever is rotated on its pivot 53' it swings the entire cam 54 with it about said pivot. This movement will oscillate sector 59, which in turn will move link 57. The same movement may be imparted to link 57 by rotation of cam 54 on pivot 55 by means of the cam groove 95. The extent of movement of link 57 caused by a given movement of either the hand lever or the cam is obviously controlled by the position of pin 58 in the slot in sector 59. By bringing the pin down to the pivot of the sector, the control from the cam and hand lever can be cut out entirely. The object in using the control from the steering rudder is to provide a means whereby the aeroplane is automatically banked to the necessary angle when turning, the rudder E for this turning being actuated by the usual steering lever or wheel. It will be seen that while the cam 54 and its associated parts form a convenient means of accomplishing this result, other mechanical equivalents may be employed within the scope of this invention. It should also be noted that this system is adapted to be used on an aeroplane which is steered simply by warping the main planes or moving the ailerons, since in such a case the cam could be thrown out by the means described above. The hand lever 52 is employed to correct and adjust the relative parts and may also be used to move the ailerons, if desired. While described as a hand lever, it may readily be controlled from a larger hand lever located adjacent the main control levers, by means of wires 98.

Coming now to the control for preventing pitching of the aeroplane, I make use of a similar differential gear train comprising sectors 49' and 51', pinions 551' and arm 56'. The stationary control arm 200 is mounted on one end of bail 13. The movable control arm 99 of this system is mounted on sector 51' and its motion is governed by the following factors:—first, the pitching of the whole aeroplane, which acts on the arm in the same manner that the lateral tipping acts on arm 42, as explained above; second, a compensating control from the elevating means (rudders, etc.) which control is introduced through sector 47' on gear sector 49' through wire 100, shown in the preferred form of the invention as connected to a drum 101, similar to drum 44, from which cords lead to the elevating planes. Both drums 44 and 101 are made with spring winding means (not shown) so that the connecting cords are kept taut. The effect of this follow up connection from the elevating planes is similar to that described in connection with the lateral control. Thirdly, a hand control is introduced through arm 56' on which is pivoted a link 102, slidably secured in a slot 103 in forward extension 203 of hand lever 104. The slot is constructed so that when the end 104' of the link is at the bottom of the slot, as shown in Fig. 1, the link 102 is unaffected by the oscillation of the hand lever, while, when raised to a horizontal position (indicated in Fig. 13), it is reciprocated by said lever. Automatic means are provided to hold lever 102 normally horizontal, but to cause the end 104' in slot 103 to drop when the velocity of the aeroplane falls below the critical speed, thus throwing out the hand control. Another effect is accomplished through the same instrumentalities, and that is the slight movement of arm 56' to the right in Fig. 1, when end 104' drops, which may be accomplished by making the slot 103 slightly eccentric with respect to the pivot 105 of link 102, or by so designing the hand lever that its normal position is such that the top of slot 103 is nearer said pivot 105 than the bottom. The resultant movement of arm 56' causes a slight shift in the position of master control arm 99 such as to cause the elevating planes to tilt to exactly the required extent to cause the aeroplane to volplane smoothly.

The automatic means for accomplishing these two results consists of electromagnets 106, the armatures 106' of which are connected to a lever 107 hinged to the magnet frame at one end and to a link 108 at the other end. Link 108 is pivoted to link 102 as shown. The action of the linkage is apparent from an inspection of Figs. 1 and 13, the normal position being shown in the latter figure. When the magnets are energized armatures 106' are drawn up, throwing link 102 down. Link 102 is normally maintained up, in the operative position by means of a tension spring 307, connected to link 107.

These magnets are controlled through a special instrument 110, which is in the nature of an anemometer. It comprises a fan 111, mounted on a shaft 112, journaled in the casing 113. Secured between the casing and shaft 112 is a spiral spring 114 which tends to rotate the shaft in the opposite direction from that in which the fan 111 tends to rotate it when the wind blows against it, so that the wind will wind up the spring until the tension of the spring exactly balances the torque of the fan. Stops 114' and 115 are provided so that the spring may be kept at a certain tension and so that the wind cannot wind it up too far. These stops are adjustable in slot 116 in the fan 111 and are adapted to abut against a pin 117, fixed in casing 113. A spring brush 118 is fixed on shaft 112 and normally bears on the periphery of circular piece 119 of insulation. A metal strip 120 is secured in a portion of the periphery of said insulation and is positioned so that the brush 118 will contact with it when the fan turns a predetermined amount, and thus close an electrical circuit through the magnets 106. The casing is provided with an adjustable back plate 121, to which the circular piece 119 is secured. Adjustment of said plate is secured through slots 122 in the plate and set screws threaded in a flange on casing 113. By adjustment of said plate, the point at which the brush engages the conducting strip 120 can be varied to fit the instrument for use on aeroplanes which possess different critical speeds. It will be seen that this device not only will operate to volplane the aeroplane when its speed falls below the critical speed, but will throw the controls back into their normal positions, when the critical speed is again exceeded.

It will be noted that in the longitudinal control shown in Fig. 1 but three normal control factors are used with one throw out control, and hence a part corresponding to cam 54 in the lateral system is not used. In Fig. 13, however, I have shown a fourth factor introduced by means of a similar cam system 54'. Hence the mechanism used is substantially the same as that used on the lateral control, except that an additional throw out means is provided. This means comprises the same elements as the throw out means in the main form (i. e. links 102, 107 and 108). The slotted portion 103' of handle 104'' then becomes the sector 59', by changing its details to correspond to sector 59, and lever 52' becomes the new hand lever. Also pin 92' is normally removed, since it would prevent the operation of the throw out means, but may be inserted if it is desired to cut out said means. It is apparent that when the end 104' of link 102 is thrown down to the center of oscillation of sector 59' by the throw out system heretofore described, the manual control through either handle 52' or 104'' is rendered inoperative, as is also control through cam 54'. The factor that is introduced through said cam is a means to increase the sensitiveness of the control. It is controlled by any type of auxiliary plane which shifts its position when the vertical component of the wind changes. By way of illustration I have shown a small plane 151 mounted on a horizontal pivot 152 in brackets 123'', shown as supported on the engine brackets 138. The forward bracket 123'' is broken away so as not to hide the lateral control system. The plane 151 is designed to fly in the direction in which the wind is blowing in the vertical plane, that is, as the aeroplane moves through the air it will normally fly horizontal, but if a gust of wind with a downward component strikes it, it will turn up to meet it. Control wires 124', 125' and 126 communicate the movement of the plane or vane 151 to sector 59' through drums 127 and 128. The action of this factor is to anticipate pitching of the aeroplane by applying a righting force almost at the instant the wind changes. Its action, of course, is not direct but is subject to corrections from the other factors.

So far, I have described only a general system of control dependent upon the changes in relative position of the individual units in each of two pairs of master control arms (i. e., arms 41 and 42 for the lateral, and 200 and 99 for the longitudinal control). I have shown two methods by which the movement of these arms may be utilized to effect the control of the stabilizing planes. The first is by means of the electrical contact system shown in Figs. 1, 2 and 6. A trolley 122 is mounted on arm 42, and a pair of contact strips 123 and 124 are mounted on arm 41. A small space is left between the strips through which an insulated knife edge 125 projects. When the aeroplane is in perfect equilibrium the trolley rests on knife edge 125, but the slightest disturbance causes it to contact with one of strips 123 or 124. As before explained, the action is vibratory. The electrical features of the longitudinal system are identical with those just described and need not be further mentioned. When contact is made with strip 123 by the tipping of the aeroplane to the left, for instance, a circuit is closed through solenoid 80, which causes the lateral stabilizing planes to be operated through any suitable power applying mechanism, a preferred form of which I will now describe:

Instead of employing said electric circuit to move the planes, use is made of an independent source of power, controlled in its application by said circuit. I employ as a prime mover a fan or wind mill 60, adapted to be driven continuously by the air currents caused by the movements of the aeroplane. Its advantage over an electric actuating means is at once apparent, since the wind will keep it rotating even if the engine and generator stop, as long as the aeroplane maintains its velocity, so that an unfailing source of power is provided. The wind mill is of special construction to secure a uniform speed of rotation independent of the velocity of the wind. The blades are mounted on spindles 61, which are rotatably mounted in the hub portion 62. Inclined slots 63 are provided in the back of the hub in which pins 64 on the spindles 61 are adapted to work. Springs 65 are provided which force the spindles toward the center by bearing between a portion of the hub and a collar 64' on the spindles. The slots are so positioned as to rotate the fan blades toward an inoperative position, normal to the wind, as the pins 64 move outward in the slots. The top and bottom blades in Fig. 6 are shown as turned to such a position. The position of the pins in the slots is of course governed by the centrifugal force of the blades, so that when the fan is revolving beyond a certain speed the blades will be turned so as to receive less impulse from the wind. A cover plate 66 is provided for the hub, which has been removed in Fig. 7.

Clutches 67 and 68 are provided to transmit the motion of the fan to the stabilizing planes. These clutches are shown as duplicates and as electrically operated from the control system heretofore described. The shaft 69 on which the wind mill is mounted serves as a common drive shaft for both clutches, by mounting the whole device so that the pinion 70 on shaft 69 drives both the gears 71 and 72. An idler 73 is provided which meshes with pinion 70 and drives gears 74 and 75 in the opposite direction from gears 71 and 72, respectively. Each gear is provided with a clutch face 76 and 76' and is mounted on a sleeve 77. Adjacent one end of each sleeve is secured an armature 78, while a collar 79, which also serves as one part of a ball bearing, is fastened near the other end.

In operation, the four gear-clutches are continuously rotated at good speed by the wind mill. When the aeroplane tilts, or when some other portion of the mechanism causes one of the contact rollers to contact with a segment, the connected solenoid draws the rapidly rotating gear clutch into engagement with the disk 84, thereby actuating the stabilizing planes. But as soon as said planes are turned through a small angle, the follow up system, described above, causes disengagement of the clutch. My follow up system is peculiarly adapted to control my specific type of electrical control for the stabilizing planes. By means of it an accurate adjustment is secured, even though the condition of the clutch faces or the velocity of the wind mill varies to a considerable extent, since adjustments of the elevators will continue only so long as the main plane tends to tilt, or in other words until equilibrium is reached.

Windings 80, 80', 80'' and 80''' are provided which are designed to pull the armatures 78 toward the beveled faces 81 of the electromagnets 82. Springs 83 hold the armatures 78 and clutch faces 76 normally away from magnets 82 and the central disk 84, respectively. When one magnet is energized, however, the adjacent armature is pulled inward and the clutch 76 is engaged with the disk 84, which is thus rotated. This disk is fastened to a central shaft 85, carrying a pinion 86 through which the drum 87 is rotated by means of a reduction gear. Any suitable means such as cords 88 transmit the motions of drum 87 to the ailerons C, C' (Fig. 18), or warping devices, while the cords 88' communicate with the elevating planes D (Fig. 17). A convenient method of communicating the motions of the control planes back to the differential trains on the gyroscopic frame, is to equip the drums 87 and 87' with auxiliary drums 89 and 89', from which cords 90 and 90' lead back to the trains, as heretofore described. Proper adjustment of the armatures and clutches is made by threading the electromagnets 82 in the framework 67 and providing them with pins 82' which project through slots in said framework.

The whole electrical system is so designed as to remain operative for a considerable time after the engine and generator stop. The gyroscopes are constructed to maintain their support in equilibrium for a considerable period after the power is shut off, while the wind mill 60 rotates as long as the aeroplane maintains sufficient speed, and the solenoid circuits require so little current that they may be operated from batteries, as shown.

In Figs. 17 and 18, which show diagrammatic views of an aeroplane of the Curtiss type, no attempt is made to show details, the gyroscopic stabilizer proper being indicated by the letter A and the clutches by B. Letters P and P' denote the main supporting planes, C and C' the ailerons, D the elevating rudder and E the steering rudder. In order not to confuse the drawings, the usual hand control levers are omitted, but it will be understood, of course, that such are preferably provided, which are operable either in conjunction with or independently from the automatic control.

My primary system of control is also well adapted to control a compressed air force applying means, which comprises the second method of control above referred to. This system is shown in Fig. 13. The master control lever is extended to form a lever 99', while fixed arm 200 becomes a fixed bar 200'. Pivoted to lever 99' is a link 131 which is pivoted at its other end to a differential link 132. A second cross link 133 is pivoted at one end to bar 200' and at the opposite end to link 132, the lower end of which is pivoted at 136 on the valve rod 134 of air motor 135. The valve rod is constrained to move longitudinally, only, so that point 136 cannot move up or down. Point 136 is placed in horizontal alinement with the center of rotation of bar 200' and lever 99'. It is apparent that as long as said levers keep in line no motion will be imparted to point 136, but any change in their relative angular positions will move said point longitudinally and actuate the valves in the valve chest 137 of air cylinder 135. Said cylinder is shown as supported on a bracket 138 which also furnishes support for brackets 123 and bearings for drum 127 and a lever 139 controlled from piston rod 140 through links 141 and 142. Cords lead from lever 139 to the elevating planes. Lever 139 also furnishes a suitable means to actuate the follow up sector 49', which is accomplished by means of wire 143 secured at one end to sector 47', passing over a drum and secured at the other end to said lever. It will be seen that lever 139 corresponds to drums 87' and 89' in the electric control system, while air cylinder 135 corresponds to wind mill 60, the air valves to the solenoid clutches 78 and linkage 131, etc., to the trolley contact system.

The pneumatic lateral control system comprises the same master control system as shown in Fig. 1, modified in the same fashion that the longitudinal system is modified in Fig. 13. Master control lever 42 becomes 42''; arm 41, 41' and a similar linkage 131', 132' and 133' transmit the governing motion to a valve rod 134' on air cylinder 135', which actuates a lever (not shown) similar to lever 139 to control the ailerons, or like devices.

In Fig. 15 are shown a couple of further modifications which may be applied to the longitudinal control system. This figure corresponds to Fig. 13 and parts are similarly numbered. Instead of employing a horizontal vane 151, I here show a vertical vane or plate 251, secured to a rod 250, pivoted at 252 to a bracket 222. The vane is normally held in a vertical position by means of a tension spring 225 and stop 226. A second rod 227 is connected to rod 250 so as to rotate therewith. Rod 227 forms the means whereby wires 224 are secured to the vane, so that motion may be communicated to cam 54' through drums 127' and 128'. Vane 251 is so designed as to be rotated only by a sudden, strong puff of wind, such as would tend to cause the main planes to tilt up into the wind. It is connected to the cam so that it will cause the aeroplane to dive into the gust. Hence it may also be termed an anticipatory device.

Another novel feature shown in Fig. 15 is an automatic landing device. This comprises a long lever 230, pivoted at 231 to the fixed frame. It is pendulous, so that it normally hangs vertically. It is connected adjacent its top to lever 52'' by means of a link. When the aeroplane is about to alight the lower end of the lever 230 will first strike the earth or water and swing it to the right. This will cause the control mechanism to throw the elevating planes up at a considerable angle through the connections already described in connection with the other figures and will hence cause the aeroplane to gradually settle, as its speed diminishes. In other words, the planes are set for steep climbing, but, as the aeroplane is presumably running under moderate engine power, it will not climb but will rapidly slow off and gradually settle.

A third special feature of Fig. 15 is a barometric means to control automatically the angle of incidence at which the main planes are set according to the lifting power of the air. It is well known that at high altitudes a greater angle of incidence is required, so that the barometer 210 is arranged to increase said angle when the aeroplane gets above a certain altitude. It accomplishes this result by closing an electric circuit 211 in which is arranged a solenoid 212. The armature of said solenoid is connected to a wire 213 fastened to the hub 531 of lever 52''. A dash pot 220 is also connected to said wire. A sliding block 214 is pivoted on the hub and slides in a short slot 221 in the frame. Spring 215 normally holds said block and hub at the left in the slot, but, when the solenoid is energized, it will draw the block and hub to the right end, which will result in turning the elevating planes up slightly by moving cam 54' bodily to the right.

Fig. 15 also shows a larger handle 216 which was referred to above and which is connected to the lever 52''. This handle is situated adjacent the main control levers and is provided with a pawl and ratchet mechanism 217 and 218, so that lever 52'' may be held fixed on its pivot unless handle 216 is moved. If auxiliary handles 216 are not employed, the bearings of the levers 104 and 52 are made tight so as to hold the levers in the position in which they are set.

The general mode of operation of the entire stabilizer will be apparent from the foregoing description. An exact discussion of its action on an aeroplane cannot be given because it must be connected up differently for each type of machine and, in fact, for each individual machine. In general, however, its action is much more accurate and quick than that of the best of aviators, the apparatus being so sensitive that it detects a tilting of the aeroplane long before the aviator would become aware of it. It also automatically tilts the stabilizing planes to exactly the correct amount to right the aeroplane, since the amount of tilting is directly proportional to the inclination of the aeroplane, and automatically turns said planes back to the horizontal as the aeroplane rights itself.

It should also be noted that the handles 52 and 104 furnish means whereby any inaccuracies of the automatic control may be readily corrected, without disconnecting the control, so that the aviator does not have to surrender entire control of the aeroplane when the automatic control is in but may have it under supervision; so that if the apparatus is not performing its function properly for any reason, such as an unusual condition of the atmosphere or faulty installation of the apparatus, the aviator may readily correct it. Handle 104 also furnishes the means by which the aviator is enabled to ascend or descend, while the apparatus is operating, without in the least affecting its sensibility. Of course, if desired the aeroplane on which my device is installed may be provided with means whereby the entire automatic system may be cut in or out at will, thus leaving the aviator to control the aeroplane with the usual hand levers.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also while it is designed to use the various features and elements in the combination and relations described, some of these may be altered and others omitted without interfering with the more general results outlined, and the invention extends to such use.

Having now described my invention, what I claim and desire to secure by Letters Patent is:

1. In an aeroplane, a gimbal mounting, a pair of gyroscopes mounted thereon for precession relative thereto, means connecting the gyroscopes allowing only equal and opposite precession, yielding means for centralizing the gyroscopes, a servo motor mounted on the vehicle and means actuated by relative tilting of the aeroplane and gimbal for exciting the servo motor.

2. In an aeroplane, a gimbal mounting, a pair of gyroscopes mounted thereon for precession relative thereto, means connecting the gyroscopes allowing only equal and opposite precession, yielding means for centralizing the gyroscopes, independent means for stabilizing said mounting about an axis at an angle to the axis of stabilization of the said gyroscopes, a servo motor mounted on the vehicle and means actuated by relative tilting of the aeroplane and gimbal for exciting the servo motor.

3. In an aeroplane, a gyroscope pendulum, a servo motor, means actuated by relative tilting of the aeroplane and pendulum about a transverse axis for exciting the servo motor and a part affected by the relative velocity of the aeroplane in the direction of its travel for shifting the effective actuating position of said means, whereby the angle of incidence bears a predetermined relation to the velocity of the aeroplane.

4. In an aeroplane, a pendulous device, a servo motor for controlling the stabilizing planes, coöperating means connected to the device and to the aeroplane for actuating the servo motor upon tilting of the aeroplane about a transverse axis, hand control means connected to said means and a safety device adapted to change the effective relation between said means and the pendulum when the velocity of the air craft falls below its critical speed.

5. In an aeroplane, a pendulous device, a servo motor for controlling the stabilizing planes, coöperating means connected to the device and to the aeroplane for actuating the servo motor to maintain the angle of incidence of the aeroplane constant, and a part affected by the relative velocity of the aeroplane for changing the effective relation between said means and the pendulum whereby the angle of incidence is changed.

6. Apparatus for the automatic control of vehicles, comprising a gyroscopic pendulum, a servo motor mounted on the vehicle, a manually actuated part for effecting the operation of said servo motor and a part affected by the relative velocity of the vehicle for throwing the said manually actuated part in and out of action.

7. Apparatus for the automatic control of vehicles, comprising a gyroscopic pendulum, a servo motor controlled thereby mounted on the vehicle, a manually actuated part for effecting the operation of said servo motor and a part affected by the relative velocity of the vehicle for throwing the said manually actuated part in and out of action and simultaneously effecting an alteration in the movement of the vehicle.

8. In a stabilizing system for air craft, a pendulous platform, means whereby a relative tilting between said platform and the air craft will actuate a servo motor controlling the stabilizing planes, hand controlled means connected to said first mentioned means, and a safety device adapted to render inoperative said hand control means when the velocity of the air craft falls below its critical speed.

9. In a stabilizing system for air craft, a pendulous platform, means whereby a relative tilting between said platform and the air craft will actuate a servo motor controlling the stabilizing planes, hand control means connected to said first mentioned means, and a safety device adapted to disconnect said hand control means and to move said first mentioned means to a new position when the velocity of the air craft falls below its critical speed, whereby the air craft is automatically volplaned.

10. In an aeroplane, a pendulous device, a servo motor for controlling a stabilizing plane, coöperating means connected to the device and to the aeroplane for actuating the servo-motor upon tilting of the aeroplane about a transverse axis, a manual control member connected to said means for changing the effective relation between said means and the pendulous device whereby the aeroplane may be controlled at will through said device, means for controlling said servo-motor by said pendulous device upon tilting of said aeroplane about a longitudinal axis and a follow-up connection connected to said pendulous device and called into action upon actuation of said servo-motor.

11. In an automatic control for air craft, a differential mechanism adapted to control the motions of a master controller, comprising a shaft secured upon the air craft, a train of differential gearing on said shaft, one being secured to the master controller, a second being adapted to be connected to the stabilizing planes, a pivoted hand lever, a cam rotatably secured to said hand lever at a distance from its pivot, said cam being adapted to be controlled from the steering mechanism and being connected so as to oscillate the third arm of said train, either upon rotation or upon movement of the hand lever, whereby the motions of the master controller are the resultants of the motions of four separate means.

12. In an automatic control for air craft, a plurality of relatively movable electrical contacts, a double throw electric clutch actuated from said contacts, comprising a normally stationary clutch face, oppositely rotated clutch faces on each side of said clutch face, a solenoid armature connected to each of said last mentioned clutch faces and adapted to push it against said stationary clutch, and means for rotating continuously said rotatable clutches.

13. In an automatic control for air craft, a plurality of relatively movable electrical contacts, a double throw electric clutch actuated from said contacts, comprising a normally stationary clutch face, oppositely rotated clutch faces on each side of said clutch face, a solenoid armature connected to each of said last mentioned clutch faces and adapted to push it against said stationary clutch, and means for rotating continuously said rotatable clutches comprising a miniature wind mill adapted to be rotated by the rush of air past the machine.

14. A stabilizing means for unstable bodies, comprising a pair of oppositely rotating rotors adapted to stabilize about one horizontal axis, a second pair of oppositely rotating rotors mounted with their axes of rotation at an angle to said first mentioned rotors and adapted to stabilize about the other horizontal axis, a common support for both pairs of rotors, whereby said support is stabilized, and means controlled by the relative movement between the main body and said support to right said body.

15. A stabilizing device for unstable bodies, comprising a stabilized gyroscopic system, a force-impressing means adapted to exert a torque about an axis of the system, a controlling means for said force impressor adapted to be actuated by the precession of a gyroscope in the system, and means controlled by the relative movement between the main body and said system to right said body.

16. A stabilizing device for unstable bodies, comprising a support fixed on said body, a system of gyroscopes mounted on said support for free and concerted oscillation about two horizontal axes, and precessional movements about axes at right angles to said first mentioned axes, means to limit said precessional movement, comprising a force-impressor adapted to exert a torque about one of said first mentioned axes, and controlling means for said force impressor adapted to be actuated by a predetermined precessional movement of the gyroscope, whereby a stabilized system is provided, and means controlled by the relative movement between the main body and said system adapted to right said body.

17. In a gyroscopic stabilizing system, a centralizing means for the rotor frames comprising a force impressor motor, one member of a clutch mounted on the motor shaft, a second shaft mounted in alinement with the motor shaft, a complementary clutch member on said second shaft, said motor shaft being automatically movable longitudinally to close said clutch and a balancing mass connected to the motor shaft adapted to prevent the clutch being closed by acceleration pressures.

18. In a gyroscopic stabilizing system, a centralizing means for the rotor frames comprising a force impressor motor, one member of a clutch mounted on the motor shaft, a second shaft mounted in alinement with the motor shaft, a complementary clutch member on said second shaft, said motor shaft being automatically movable longitudinally to close said clutch and a balancing means adapted to prevent the clutch being closed by acceleration pressures, comprising a lever pivoted on a fixed part to one side of said shaft, having its inner end pivoted to the shaft, and a mass mounted on said lever on the opposite side of the pivot on the fixed part from said shaft.

19. In a gyroscopic stabilizing system, a centralizing means for the rotor frames comprising a force impressor motor, one member of a clutch mounted on the motor shaft, a second shaft mounted in alinement with the motor shaft, a complementary clutch member on said second shaft, said motor shaft being automatically movable longitudinally to close said clutch, and a balancing means adapted to prevent the clutch being closed by acceleration pressures, comprising a plurality of bearings symmetrically placed about but spaced from said shaft, a lever pivoted in each bearing, the inner end of each lever being pivoted to said shaft and a mass mounted adjacent the outer end of each lever.

20. In a gyroscopic stabilizing system supported on gimbal rings, a centralizing means for the rotor frames comprising a gear mounted on one of said rings, a train of reduction gearing connected to said gear, a force impressor motor and a clutch, operable by the endwise pull of the motor armature, mounted between said gearing and the motor, whereby the normal oscillations of the gimbal ring are not interfered with.

21. In a stabilizing system for air craft, a platform stabilized against fore and aft tilting, means whereby a relative tilting between said platform and the air craft will actuate the stabilizing planes, hand control means connected to said means, and a safety device adapted to disconnect said hand control means and to move said first mentioned means to a new position when the velocity of the air craft falls below its critical speed, whereby the air craft is automatically volplaned.

22. In an automatic lateral control system for aeroplanes, a pendulous, stabilized system of gyroscopes, a force impressing means operatively connected with said system and adapted to prevent acceleration forces from affecting the stability of the system, a master controlling means mounted between said system and the frame of the aeroplane and adapted to control the lateral stability of the aeroplane, connections between the steering rudder and said control means, whereby the relative position of the master controlling means and the stabilized system is the resultant of the inclination of the main aeroplane and the position of the steering means.

23. In an automatic lateral control system for aeroplanes, a pendulous, stabilized system of gyroscopes, a force impressing means operatively connected with said system and adapted to prevent acceleration forces from affecting the stability of the system, a master controlling means mounted between said system and the frame of the aeroplane, and adapted to control the lateral stability of the aeroplane, follow up connections between the lateral stabilizing planes and said controlling means, connections between the steering rudder and said controlling means, whereby the relative position of the master controlling means and the stabilizing system is the resultant of the inclination of the main aeroplane, the position of the stabilizing planes and the position of the steering means.

24. In an automatic lateral control system for aeroplanes, a pendulous, stabilized system of gyroscopes comprising a support mounted on longitudinally positioned pivots, a rotor mounted on said support for precession about an axis at right angles to the axis of the support, a force impressor connected with said support and adapted to exert a torque about its axis, whereby the precession is limited and acceleration forces are prevented from affecting the stability of the system, a master controlling means mounted between said system and the frame of the aeroplane and adapted to control the lateral stability of the aeroplane, connections between the steering rudder and said control means, whereby the relative position of the master controlling means and the stabilized system is the resultant of the inclination of the main aeroplane and the position of the steering meens.

25. In an automatic control for aeroplanes, a pair of Cardan ring supports, one of which is pivoted on a fore and aft axis, while the other is pivoted on a laterally extending axis, two pair of oppositely rotating gyroscopes mounted on said second support with the precessional axes vertical and their spinning axes horizontal, rigid connections between the units of each pair and a centralizing means, whereby their axes are normally parallel, one pair being mounted with their spinning axes at an angle to the other pair, lateral control means mounted adjacent the longitudinal axis of the Cardan rings and longitudinal control means mounted adjacent the lateral axis of said rings, and connections between both said means and the rings, whereby said means are actuated on the tipping of the aeroplane laterally or longitudinally, respectively.

26. In an automatic control for aeroplanes, a pair of Cardan ring supports one of which is pivoted on a fore and aft axis, while the other is pivoted on a laterally extending axis, two pairs of oppositely rotating gyroscopes mounted on said second support with their precessional axes vertical and their spinning axes horizontal, rigid connections between the units of each pair, a centralizing spring whereby their axes are normally parallel, one pair being mounted with their spinning axes at an angle to the other pair, a force impressor connected to said first mentioned Cardan ring and adapted to exert a torque about its axis, a decentralizing means coöperating with said force impressor and adapted to overcome the effect of said spring, lateral control means mounted adjacent the longitudinal axis of the Cardan rings and longitudinal control means mounted adjacent the lateral axis of said rings, and connections between both said means and the rings, whereby said means are actuated on the tipping of the aeroplane laterally or longitudinally, respectively.

27. In an automatic control for air craft, power means to move the stabilizing planes, comprising a central hub, a plurality of fan blades adjustably mounted in said hub, said hub being provided with cam grooves, pins fixed on said blades adapted to work in said grooves and springs adapted to hold said pins normally adjacent the base of said grooves, whereby the velocity of the fan is kept constant through a wide range of wind velocity, clutch connections between the fan and the planes, and controlling means for such connections actuated from changes in air currents.

28. In a stabilizing system for aeroplanes, an anemometric device controlled by the velocity of the wind, a hand control means, a servo motor connected with longitudinal control plane of the aeroplane, said motor being normally controlled from said hand means, and means for disconnecting said hand means and adapted to be actuated from said anemometric device, whereby stalling of the aeroplane is prevented.

29. In an automatic control for aeroplanes, a mechanism for preventing stalling of the aeroplane comprising a fan mounted on a shaft and adapted to be rotated by wind, a spring secured so as to exert a torque opposed to that exerted on the fan by the wind, and means including an electrical contact controlled by the angular position of the fan adapted to control the position of the stabilizing planes.

30. In an automatic control for aeroplanes, a mechanism for preventing stalling of the aeroplane comprising a fan rotatably mounted on a casing, a torsion spring secured in said casing so as to exert a torque on the fan opposed to that exerted by the wind, coöperating stop means on the fan and casing adapted to limit the rotation of the fan, a plate adjustably secured to said casing, a contact strip on said plate whereby the angular position of said strip may be varied, and a coöperating brush moved by the rotation of the fan and an electrical control in circuit with said strip and brush adapted to actuate upon excitation the stabilizing planes, whereby the aeroplane is automatically volplaned on slowing down below the critical speed.

31. In an automatic control for aeroplanes, a servo motor connected with the stabilizing planes, automatic control means for said motor actuated by a change in the air currents, a hand control means for said motor and means whereby said hand control is thrown out and said automatic control means moved when the velocity of the aeroplane falls below its critical speed, whereby the aviator is warned and the aeroplane is automatically volplaned.

32. In an automatic control for aeroplanes, a servo motor connected with the stabilizing planes, automatic control means for said motor actuated by a change in the air currents, a hand control means for said motor connected through said automatic means, comprising a pivoted handle provided with a cam slot adjacent its pivot, an arm pivoted adjacent said handle and connected through said automatic control to the motor, a link pivoted to said arm and working in said slot in the handle, means to hold normally the link away from the pivot of the handle, electro-magnetic means adapted to throw said link to said pivot and an anemometric electric switch in circuit with said electro-magnetic means.

33. In an automatic control for aeroplanes, a mechanism for preventing stalling of the aeroplane, comprising a fan mounted on a shaft and adapted to be rotated by wind, a spring secured so as to exert a torque opposed to that exerted by the wind on the fan, a servo motor, a hand control device for said servo motor, and means, the operation of which depends upon the angular position of the fan, connected to said servo motor through said hand device, whereby upon actuation said hand device is rendered inoperative and said servo motor is actuated simultaneously.

34. Apparatus for the automatic control of aeroplanes, comprising a pendulous support stabilized by gyros about both horizontal axes, the ballistic of said support being less about the lateral axis of the aeroplane than about the longitudinal axis, a force-impressing mechanism adapted to prevent acceleration forces from affecting the stability of said support about said longitudinal axis, and controlling mechanism mounted adjacent each axis, moved by the relative inclination of said support and the aeroplane, adapted to control the position of the stabilizing planes.

35. Apparatus for the automatic control of aeroplanes, comprising a pendulous support stabilized by gyros about both horizontal axes, the ballistic of said support being less about the lateral axis of the aeroplane than about the longitudinal axis, and a force-impressing mechanism adapted to prevent acceleration forces from affecting the stability of said support about said longitudinal axis.

36. Apparatus for the automatic control of vehicles, comprising a frame fixed on a vehicle, a pendulous support pivoted by means of a Cardan connection with its axes of oscillation in line with and perpendicular to the fore and aft line of the vehicle, respectively, and stabilized by gyros about a plurality of axes, a scale and pointer for measuring the angular displacement between the support and vehicle about both axes, mechanism adapted to cause said support to be practically unaffected by translated forces of the pendulum, a plurality of servo motors mounted on the vehicle, and an actuating connection between each motor and the support, their relative points of connection with the support being at right angles to each other.

37. In an aeroplane, a pendulous device, control means operable therebetween and the aeroplane for governing the stabilizing planes, a member mounted on the aeroplane adapted to be moved by contact with the earth, and connections between said member and said control means whereby the relative position of the pendulous device and said means is shifted and the stabilizing planes set to a new position on contact of said member with the earth.

38. In an aeroplane, a pendulous device, control means operable therebetween and the aeroplane for governing the stabilizing planes, a member mounted on the aeroplane adapted to be moved by contact with the earth, and connections between said member and said control means whereby the relative position of the pendulous device and said means is shifted to set the stabilizing planes in an ascending position.

39. In a stabilizing system for aircraft, a universally mounted support, a plurality of pairs of gyroscopes mounted on said support, each pair being adapted to stabilize the support about a horizontal axis at an angle to the axis of stabilization of another pair, and means controlled by the relative movement between the aircraft and said support to right said craft.

40. A stabilizing means for aircraft comprising a pendulous gyroscopic system, stabilized about an axis, a force impressing means adapted to exert a torque about said axis on precession of a gyroscope away from its normal position, and means controlled by the relative positions of said system and the aircraft for governing the inclination of said craft about said axis.

41. A stabilizing means for aircraft comprising a pendulous gyroscopic system, stabilized about an axis, a force impressing means adapted to exert a torque about said axis on precession of a gyroscope away from its normal position, and independent power means controlled by the relative positions of said system and the aircraft for governing the inclination of said craft about said axis.

42. In an aeroplane stabilizer, the combination with the lateral stabilizing planes of a pair of gyros connected so as to be self-stabilizing laterally, means controlled by the relative lateral inclination of the aeroplane and the gyros for actuating said planes and independent means for stabilizing said gyros longitudinally.

43. In an aeroplane stabilizer, the combination with a horizontal rudder, of a pair of gyros connected so as to be self-stabilizing longitudinally, means controlled by the relative longitudinal inclination of the aeroplane and the gyros for actuating said rudder, and independent means for stabilizing said gyros laterally.

44. In a stabilizing system for aeroplanes, a gyroscopic pendulum, means controlled by a gyro of said pendulum for eliminating the effect of acceleration pressures, when turning on said pendulum, and means governed by said pendulum for controlling the stability of the aeroplane.

45. In an aeroplane, a pendulous device, a servo-motor for controlling the stabilizing planes, connections between said device and servo-motor for causing actuation of the latter upon tilting of the aeroplane about the transverse axis, a manual control member for shifting said connections to control the aeroplane at will, means for controlling said servo-motor by said pendulous device upon tilting of said aeroplane about a longitudinal axis and a follow-up connection connected to said pendulous device and called into action upon actuation of said servo-motor.

46. In an aeroplane, a pendulous device, means for stabilizing said device comprising a gyroscope, a servo-motor for controlling the stabilizing planes, coöperating means connected to the device and to the aeroplane for actuating the servo-motor upon tilting of the aeroplane about a transverse axis, a manual control member connected to said means for changing the effective relation between said means and the pendulous device whereby the aeroplane may be controlled at will through said device, and means for controlling said servo-motor by said pendulous device upon tilting of said aeroplane about a longitudinal axis.

47. In an aeroplane, a pendulous device, means for stabilizing said device comprising a gyroscope mounted with three degrees of freedom, a servo motor for controlling the stabilizing planes, coöperating means connected to the device and to the aeroplane for actuating the servo motor upon tilting of the aeroplane about a transverse axis, a manual control member connected to said means for changing the effective relation between said means and the pendulous device whereby the aeroplane may be controlled at will through said device, and means for controlling said servo motor by said pendulous device upon tilting of said aeroplane about a longitudinal axis.

48. In an aeroplane, a pendulous device, means for stabilizing said device comprising a gyroscope, a servo motor for controlling the stabilizing planes, coöperating means connected to the device and to the aeroplane for actuating the servo motor upon tilting of the aeroplane about a transverse axis, a manual control member connected to said means for changing the effective relation between said means and the pendulous device whereby the aeroplane may be controlled at will through said device, means for controlling said servo motor by said pendulous device upon tilting of said aeroplane about a longitudinal axis, and manually controlled means connected to the last mentioned means.

49. A stabilizing means for aircraft comprising a gyroscopic pendulum, means governed by the position of a gyroscope for causing an external torque to be applied about an axis of said pendulum and means controlled by the relative positions of said pendulum and the aircraft for governing the inclination of said craft about said axis.

50. A stabilizing means for aircraft comprising a gyroscopic pendulum, means governed by the position of a gyroscope with reference to an axis for causing an external torque to be applied to said pendulum about an axis at an angle to said first mentioned axis and means controlled by the relative position of said pendulum and the aircraft for governing the inclination of said craft about said last mentioned axis.

51. A stabilizing means for aircraft comprising a gyroscopic pendulum, means governed by the position of a gyroscope for causing an external torque to be applied about an axis of said pendulum and independent power means controlled by the relative positions of said pendulum and the aircraft for governing the inclination of said craft about said axis.

52. A stabilizing means for aircraft comprising a gyroscopic pendulum, means governed by the position of a gyroscope with reference to an axis for causing a torque to be applied to said pendulum about an axis at an angle to said first mentioned axis and independent power means controlled by the relative position of said pendulum and the aircraft for governing the inclination of said craft about said last mentioned axis.

53. A stabilizing means for aircraft comprising a gyroscopic pendulum, means comprising an electrical translating device for causing the application of a torque about an axis of said pendulum, means comprising an electrical contact for controlling energization of said translating device and means controlled by the relative positions of said pendulum and the aircraft for governing the inclination of said craft about said axis.

54. In combination, an aeroplane having manually operable means for controlling the position thereof about the transverse axis, means responsive to the air speed of said aeroplane and means controlled by said second named means for preventing control of the aeroplane by operation of the first named means.

55. In combination, an aeroplane having manually operable means for controlling the position thereof about the transverse axis, and means for preventing manual control of said first named means so long as the air speed of said aeroplane is below a predetermined amount.

56. In a stabilizing system for aeroplanes, a gyroscopic pendulum, means controlled by a gyro of said pendulum for opposing the effect of acceleration pressures, when turning on said pendulum, and means governed by said pendulum for controlling the stability of the aeroplane.

57. In a stabilizing system for aeroplanes, a gyroscopic pendulum, means controlled by a gyro of said pendulum for causing an oscillation-opposing force to be applied on said pendulum and means controlled by said pendulum for controlling the stability of the aeroplane about at least one axis.

58. Apparatus for the automatic control of vehicles, comprising a pendulous device, a servo motor controlled thereby mounted on the vehicle, a manually actuated part for effecting the operation of said servo motor and a part affected by the relative velocity of the vehicle for affecting the control of said manually actuated part and simultaneously effecting an alteration in the movement of the vehicle.

59. In a stabilizing system for aircraft, a pendulous device, means whereby a relative tilting between said device and the air craft will actuate a servo motor controlling the stabilizing planes, hand control means connected to said first mentioned means, and a safety device comprising an air resistance device adapted to affect both the operation of the said hand control means and said first mentioned means when the velocity of the air craft falls below its critical speed, whereby the air craft is automatically volplaned.

60. In an aeroplane, the combination with means for controlling the angle of attack, a manual device for governing said means, means responsive to a decrease in the air speed, below a predetermined amount for rendering said manual device inoperative and for volplaning the aeroplane and also responsive to a resumption of speed for restoring the manual control.

61. In an automatic pilot for aeroplanes the combination with longitudinal control means, of a gyroscopic device for normally controlling said means, a barometric device and means connecting said barometric and gyroscopic devices whereby the former alters the effective relation between the latter and the control means without disturbing the former.

62. In an automatic pilot for aeroplanes the combination with longitudinal control means, of a gyroscopic device for normally controlling said means, a barometric device and means connecting said barometric and gyroscopic devices whereby the former alters the effective relation between the latter and the control means to maintain the correct angle of attack for varying latitudes.

63. In an aerial dirigible device the combination with a longitudinal control plane, of a plurality of movable control elements therefor, one of which is gyroscopically stabilized for controlling said plane and 'a height responsive device connected to a control element.

64. In an aerial dirigible device, the combination with a longitudinal control plane of a plurality of movable control elements therefor, one of which is gyroscopically stabilized for controlling said plane, a height responsive device connected to a control element, and a follow up connection between said plane and control element.

65. In an aeroplane, a gyroscopic device, a servo-motor for controlling the lateral and longitudinal control planes, coöperating means acting between said device and the aeroplane for actuating the servo-motor, a barometric device for shifting the relative positions of said means, and follow up connections between said control planes and said means.

66. In an aeroplane the combination with a horizontal rudder, of gyroscopically stabilized means for normally controlling the angle of attack of the aeroplane through said rudder, means responsive to the air speed and operating through said first means for altering said angle of attack, and a follow-up connection between said rudder and means.

67. In an aeroplane the combination with gyroscopically stabilized means for normally controlling the angle of attack of the aeroplane and height responsive means operating through said first means for altering said angle of attack.

In testimony whereof, I, ELMER A. SPERRY, have signed my name to this specification in the presence of two subscribing witnesses, this 16th day of July, 1914.

ELMER A. SPERRY.

Witnesses:
A. W. STRINGHAM,
L. J. DIBBLE.